UNITED STATES PATENT OFFICE.

PHILIPP BURGER, OF BERLIN, GERMANY.

DEPOLARIZER FOR GALVANIC CELLS.

1,123,843.     Specification of Letters Patent.     Patented Jan. 5, 1915.

No Drawing.     Application filed July 2, 1913. Serial No. 777,104.

*To all whom it may concern:*

Be it known that I, PHILIPP BURGER, a subject of the German Emperor, and resident at 9 Claudiusstrasse, Berlin, Germany, have invented certain new and useful Improvements in Depolarizers for Galvanic Cells, of which the following is a specification.

The present invention relates to a galvanic cell, in which the carbon electrode is surrounded by a mixture of brownstone and the like.

According to the present invention chemically pure carbon in the form of soot is used in place of graphite. Preferably acetylene soot is used, which may, for instance, be obtained by decomposing the acetylene gas by means of an electric spark; the acetylene gas will thereby be divided into hydrogen and carbon.

As the apparent specific gravity of the acetylene soot is 0.9, that of graphite 2.17 to 2.20, the present invention allows of using by two thirds less carbon or acetylene soot than graphite. In consequence thereof the brownstone may be increased by this amount, whereby the life of the galvanic cell is correspondingly lengthened. The use of soot has further the considerable advantage, that it is possible to make the galvanic cells of a uniform character, as the artificially or chemically produced soot will also be absolutely uniform, contrary to the graphite which is of a very irregular composition. Lastly it is possible to mix the chemically pure carbon more intimately and evenly with the brownstone, as soot is a substance which is extremely finely divided.

The galvanic cell consists for instance in a known manner of a carbon stick, which is surrounded by a mixture of manganese dioxid and graphite, which mixture is moistened with sal-ammoniac water. The whole is placed in a zinc tank, which is filled with the exciting substance.

According to the present invention chemically pure carbon or soot is substituted in such cell for the graphite.

I claim:

1. A depolarizer for galvanic cells, comprising a mixture of manganese dioxid and finally divided chemically pure carbon in the form of soot.

2. A depolarizer for galvanic cells, comprising a mixture of manganese dioxid and finely divided chemically pure carbon in the form of acetylene soot.

In testimony whereof I have hereunto signed my name this 19th day of June 1913, in the presence of two subscribing witnesses.

PHILIPP BURGER.

Witnesses:
HENRY HASPER,
WOLDEMAR HAUPT.